H. S. MAXIM.
Feed Water-Heater.
No. 160,215.  Patented Feb. 23, 1875.
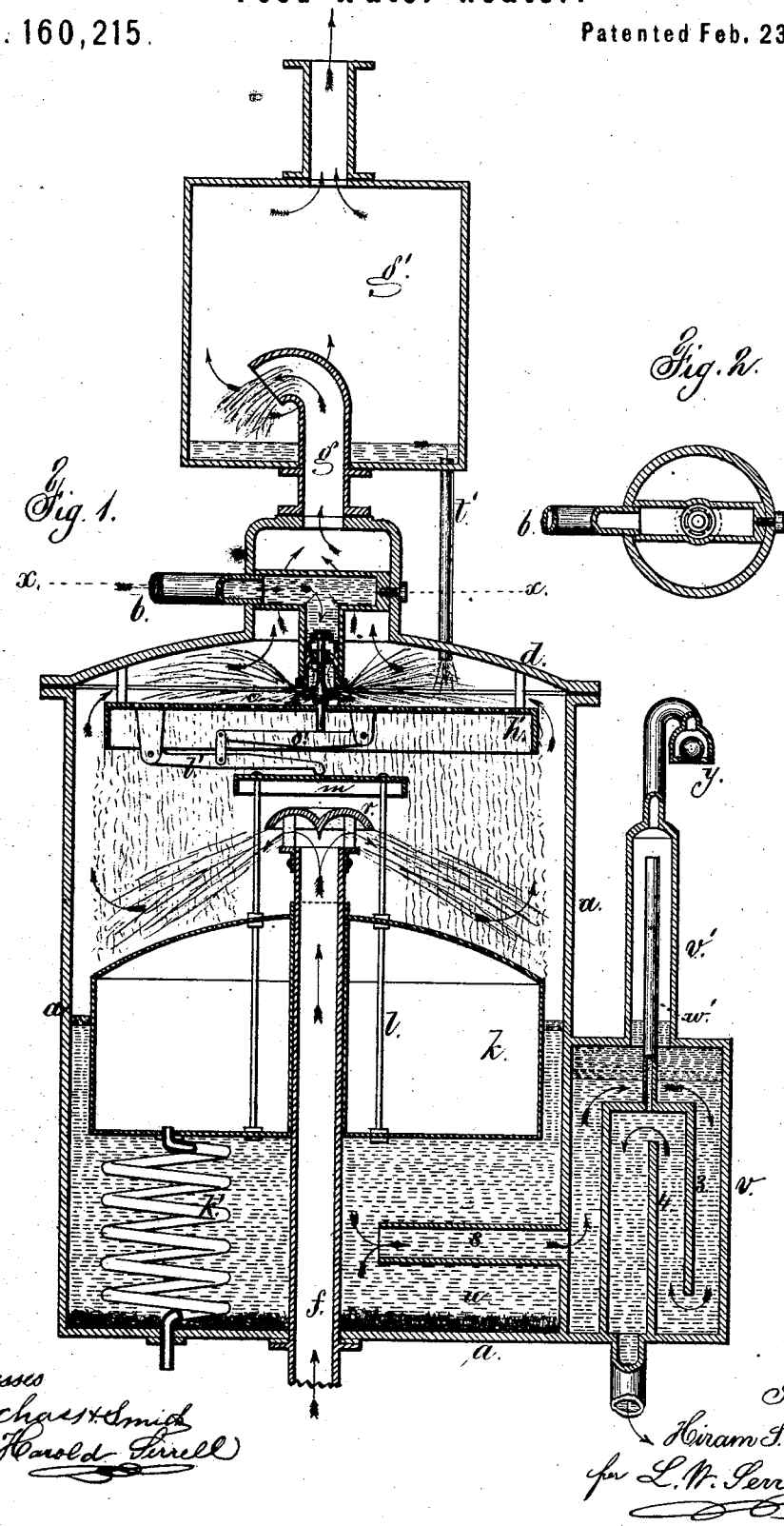

UNITED STATES PATENT OFFICE.

HIRAM S. MAXIM, OF BROOKLYN, NEW YORK.

IMPROVEMENT IN FEED-WATER HEATERS.

Specification forming part of Letters Patent No. 160,215, dated February 23, 1875; application filed November 13, 1874.

*To all whom it may concern:*

Be it known that I, HIRAM S. MAXIM, of Brooklyn, in the county of Kings and State of New York, have invented an Improvement in Feed-Water Heaters, of which the following is a specification:

This invention is an improvement upon the device patented by me May 5, 1874, No. 150,478; and upon corresponding parts of the drawing I have placed the same letters of reference as in said patent, and hereby make reference to the same for a general description of the operation of the heater.

In the drawing, Figure 1 is a vertical section of the heater complete, and Fig. 2 is a sectional plan at the line $x\ x$.

The deflector $r$ at the upper end of the pipe $f$, through which the exhaust steam passes, is made with an open space all around it in place of the mouths in aforesaid patent.

Difficulty has arisen in making the float $k$ so perfectly tight that steam or small quantities of water will not enter, and either interfere with the floating power or cause the float to collapse, from a vacuum being formed when the apparatus cools. To prevent this, I make use of a small pipe, $k'$, that is coiled, so as to obtain the necessary spring; and one end of this tube opens through the bottom of the float, and the other end passes through the bottom of the vessel $a$, so that atmosphere is freely admitted within the float $k$, and any vapors will blow off, or water run off, from such float.

With heavy pressures of water there is difficulty in obtaining a float, $k$, sufficiently powerful to close the valve $c$, at the end of the water-supply pipe $b$, by the direct action of such float. I therefore introduce the compound levers $l'\ o'$, which have their fulcrums upon the sprinkler-plate $h'$; and the lever $l'$ is acted upon by the plate $m$, and this in turn acts upon the lever $o'$, that moves the valve-stem and valve $c$, to close the same against the pressure of water when the apparatus is sufficiently filled, or to open the valve as the water is drawn off by the pump.

The sprinkler-plate $h'$ is preferable to a deflector, as the water drips from the same through the steam.

I employ the vessel $g'$ around the pipe $g$, through which the uncondensed steam escapes, to catch any watery particles and return them, by the pipe $t'$, to the vessel $a$. This vessel $g$ may be more or less distant from the apparatus.

To prevent the escape of vapor into the room containing the feed-water heater, I extend the pipe $n'$ upwardly within the tube $v'$, at the end of which is a return-bend, valve-seat, and valve, $y$. This valve opens inwardly when the water draws down to a lower level than the division 4, thereby preventing the liquid in the trap being drawn out by the pump.

I claim as my invention—

1. The combination, with the float in a feed-water heater, of a tubular spring, opening at one end within the float, and at the other end outside the heater, substantially as set forth.

2. The combination, in a feed-water heater, of a compound lever, $l'$ and $o'$, having the fulcrums upon the sprinkler-plate $h'$, and acting between the float and the valve that admits water, substantially as set forth.

3. The combination, with the oil-trap and air-tube $w'$, of the tube $v'$, neck, and valve $y$, substantially as set forth.

Signed by me this 11th day of November, A. D. 1874.

HIRAM S. MAXIM.

Witnesses:
GEO. T. PINCKNEY,
CHAS. H. SMITH.